Figure 3:
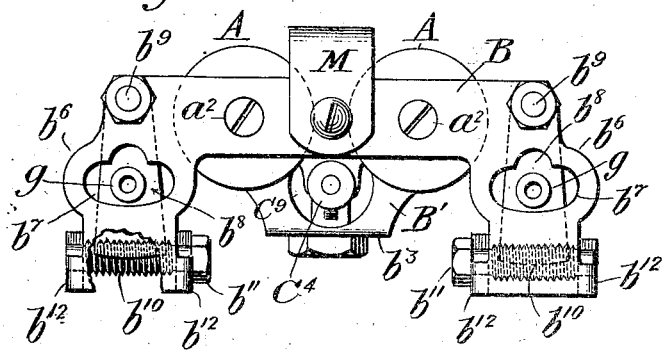

No. 842,772. PATENTED JAN. 29, 1907.
W. W. DEAN.
PARTY LINE TELEPHONE SYSTEM.
APPLICATION FILED APR. 17, 1905.
3 SHEETS—SHEET 1.
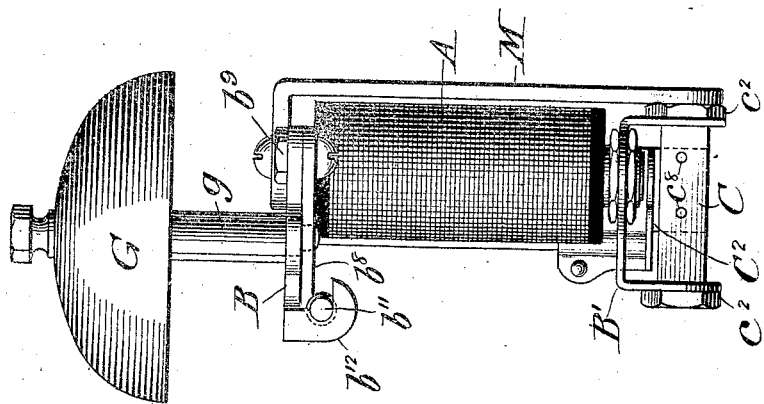
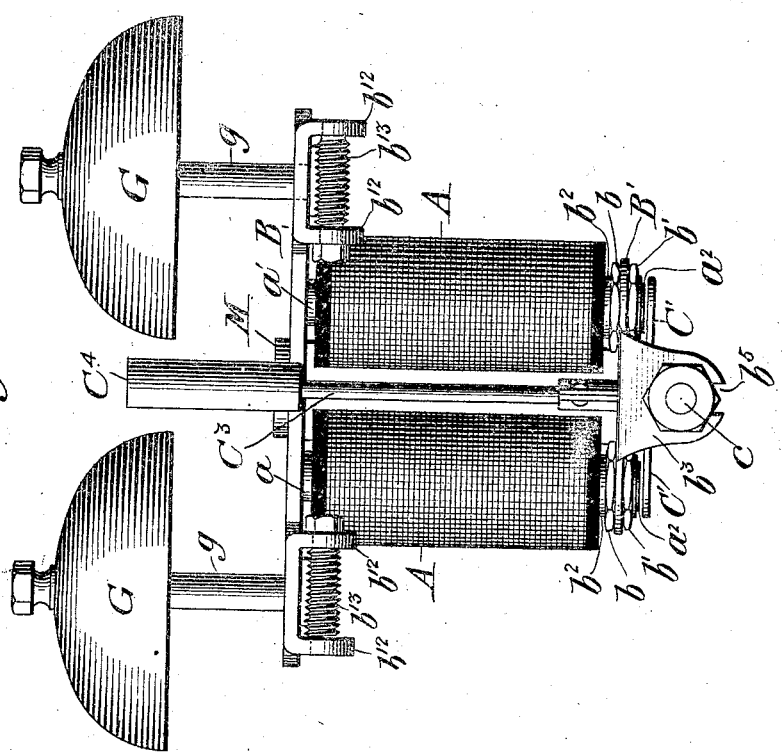

No. 842,772. PATENTED JAN. 29, 1907.
W. W. DEAN.
PARTY LINE TELEPHONE SYSTEM.
APPLICATION FILED APR. 17, 1905.

3 SHEETS—SHEET 2.

Witnesses:
Inventor.
William W. Dean
by Edward E. Clement
Atty.

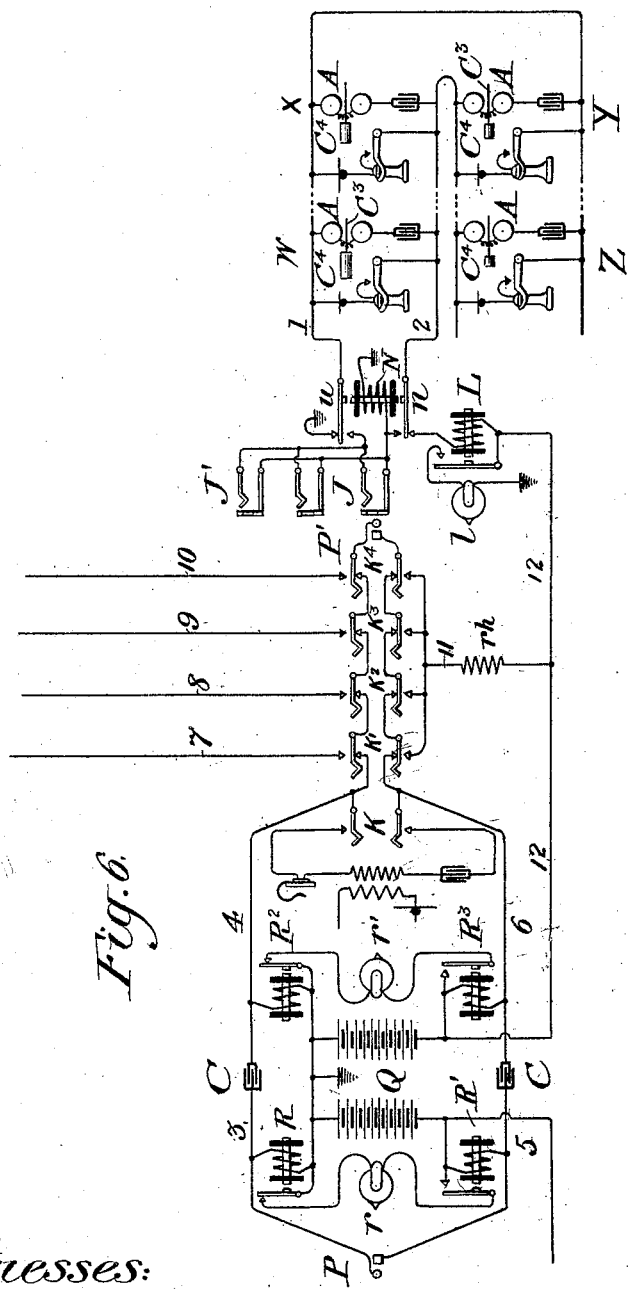

UNITED STATES PATENT OFFICE.

WILLIAM W. DEAN, OF ELYRIA, OHIO, ASSIGNOR TO THE DEAN ELECTRIC COMPANY, OF ELYRIA, OHIO, A CORPORATION OF OHIO.

PARTY-LINE TELEPHONE SYSTEM.

No. 842,772.  Specification of Letters Patent.  Patented Jan. 29, 1907.

Application filed April 17, 1905. Serial No. 255,961.

*To all whom it may concern:*

Be it known that I, WILLIAM W. DEAN, a citizen of the United States, residing at Elyria, in the county of Lorain and State of Ohio, have invented certain new and useful Improvements in Party-Line Telephone Systems, of which the following is a specification, reference being had therein to the accompanying drawings.

My invention relates to improvements in party-line telephone systems, and has for its object, generally speaking, the provision of an improved harmonic system for selective signaling and embodies the apparatus necessary in such a system, which is shown in the most convenient form for the practical operation thereof.

In harmonic selective signaling systems heretofore designed two methods have been employed. By one a reed tuned to exact pitch was relied upon to close a circuit, and by the other a mechanical signal included directly in the harmonic circuit was overtuned or undertuned to allow for losses or acceleration in operation. A third method—that of exact tuning of the mechanical elements—has been attempted at divers times, but has never succeeded, to my knowledge, prior to my present invention. The first and second methods need not be considered here, my present invention relating particularly to the third method. Systems of this type have heretofore been unsuccessful and uncommercial for several reasons. It was found difficult, if not impossible, to operate a bell having a tongue constituting a tuned reed by means of the ordinary pulsating or alternating current of a frequency or pitch corresponding to that of the bell-reed. The weight of the hammer or clapper, the manner of applying the attractive force of the magnet, and the reactive effect of the vibrating gong have always proved a source of trouble in attempting to reach a perfect tune. I have discovered, however, that it is possible by properly applying the energy of the ringing-current to positively overcome and render negligible the disturbing forces to which I have referred. In other words, without unduly increasing either the voltage or the ampere-turns in the ringer-magnets I apply the energy cumulatively in such manner as to reach an effective totality of sufficient magnitude to render small losses and disturbing elements negligible.

Expressed in a few words, my invention comprises a polarized ringer having its armature mounted in a neutral position upon a strong spring—so strong that ordinary ringing-current momentarily applied produces no effect. Only when current of the proper frequency has passed through the ringer-coils for a long enough period to start up the armature and the tuned clapper do the gongs receive any stroke. I tune the clapper-rods or reeds by fastening thereon clappers formed in cylindrical shape and of different lengths and weights.

My invention is illustrated in the accompanying drawings, in which—

Figure 4:
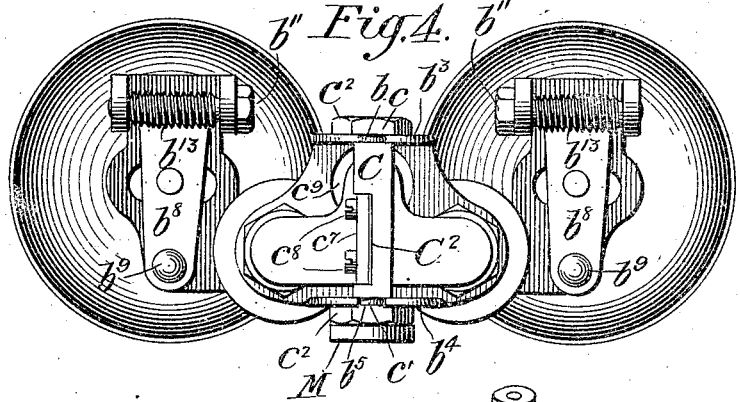
Figure 5:
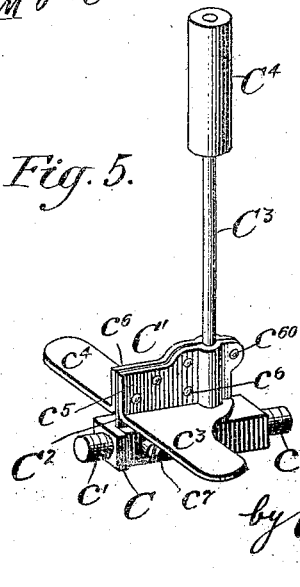

Figure 1 is a front view of a ringer with gongs mounted complete. Fig. 2 is an end view of the same. Fig. 3 is a top plan view with the gongs removed. Fig. 4 is a bottom plan view. Fig. 5 is a perspective view of the clapper-rod and connected parts removed, and Fig. 6 is a diagram of a subscriber's line having four stations equipped with my invention and the coöperating central-office apparatus.

I will first describe the mechanical structure of my ringer and then point out the method of its employment.

Referring to Figs. 1 to 5, A designates a pair of magnet-spools, with cores $a$ $a'$, secured by screws $a^2$ upon the yoke B. At the lower ends of these cores is carried a secondary non-magnetic yoke B', the same being secured by the nuts $b$ $b'$ upon the sleeves $b^2$, secured to the magnet-heads or in any other suitable manner. The yoke B' has front and rear drop portions $b^3$ $b^4$, each slotted, as indicated at $b^5$, for the reception of the ends $c$ $c'$ of the armature block or bolt C. On each of these is fitted a lock-nut $c^2$. This block and its connected parts are best shown in Figs. 4 and 5. The block C is preferably squared throughout that portion of its length which lies between the parts $b^3$ $b^4$, its ends being reduced and threaded at $c$ $c'$. The squared portion is milled out on one side to receive the stiff short leaf-spring $C^2$. To hold this in position on the block, a short bar $c^7$ is clamped upon it by means of screws $c^8$. Secured upon the spring above the block is the armature C'. This is made of pressed metal in two halves $c^3$ $c^4$, each having an upstanding flange $c^5$ or $c^6$. These two flanges are set upon opposite sides of the spring and secured together through the latter by means of rivets $c^6$. Each flange is formed with a semi-cylindrical channel to one side of the spring and an outside rivet $c^{60}$, the channels when put together receiving the clapper-rod $C^3$, which is thus secured rigidly to the armature structure by the common binding means. At its upper end the clapper-rod is fitted with the clapper $C^4$, composed of a length of tubing solidly driven on the rod. The length of this tube varies according to the tune desired.

In assembling the device the ends of the block C are inserted from beneath into the slots $b^5$, the clapper-rod at the same time passing up through an opening $c^9$ in the yoke B' and lying in front of the upper yoke B between the gongs G. The armature having been adjusted with regard to the poles $a^2$ of the ringer-magnet the nuts $c^2$ are set up tightly, and thereafter the only movement of the armature possible to make is that permitted by bending the spring $C^2$. Secured upon the upper yoke and passing down behind the magnets into contact with the rear nut $c^2$ is the permanent magnet M, and as the upper yoke B and the block C, with its parts, are of iron it follows that a very efficient magnetic circuit is thus obtained, the only breaks in which are the air-gaps between the poles $a^2$ and the armature C'. The gongs G are mounted upon posts $g$, the latter being carried upon metal segments $b^8$, each pivoted at $b^9$ upon a suitable bolt passing through the yoke B. At its front edge $b^{10}$ each segment is provided with gear-teeth meshing with the worm $b^{13}$, cut on the stem of the bolt $b^{11}$. This bolt $b^{11}$ has its ends supported in drop-bearings formed in hook shape on the yoke B, as shown at $b^{12}$, Figs. 1, 2, and 3. In order to get the best results with this ringer, an accurate adjustment of the gongs is necessary, and this adjustment, moreover, must be solid, so that when the parts are once set they will remain undisturbed by the forcible action which I contemplate. The gong-posts pass up from the segments through lateral enlarged openings $b^7$ in extensions $b^6$ on the yoke B. By means of a suitable wrench applied to the head of either bolt $b^{11}$ the same may be turned, and the worm thereon will move the segment one way or the other and with it the gong-post and gong.

It will be observed that the construction of my ringer throughout is such as to make it very solid and substantial. Its depreciation through a long period of time is intended to be negligible and its operation uniformly efficient throughout its life. It is so designed that it may be substituted for an ordinary bridging ringer or, in fact, for any ringer at any station, having parts of standard type. The sizes and general arrangement of parts are such that no special features are required in the rest of the telephone set to permit the use of this ringer.

Referring now to Fig. 6, I have shown a pair of plugs P P', connected by a cord-circuit 3 4 5 6, and provided with a listening-key K and ringing-keys K', $K^2$, $K^3$, and $K^4$. A subscriber's line 1 2 terminates at contact $n$ of the cut-off relay N, by which the line is adapted normally to be connected to a signal-relay L, controlling a lamp $l$, and when a plug is in one of the jacks J or J', to be connected thereto and disconnected from the relay. The cord-circuit contains the four relays R, R', $R^2$, and $R^3$, bridged in pairs across the two ends of the circuit, each pair jointly controlling one of the supervisory lamps $r\ r'$. Current is furnished by central batteries Q. From one of these the wire 12 extends as a common return for the line-relays, and also connected through resistance $rh$ by branch 11 as a common return for the selective ringing-keys, battery-current being thus supplied to the sleeve side of line for the cut-off relay N while ringing. Each of the selective keys K', $K^2$, $K^3$, and $K^4$, is connected on one side by wire 7, 8, 9, or 10 to a generator giving a particular frequency, so that by using the proper key any one of four frequencies may be thrown upon the line. At the four subscribers' stations W, X, Y, and Z, the four ringers are all tuned to respond to different frequencies. At station W the tubular clapper $C^4$ is long and heavy, this station being called by the lowest frequency current. At stations X and Y the length and weight of the clapper is successively reduced, and at station Z it is shortest and lowest of all, this station being called by the current of highest frequency. It is to be understood that momentary current of right or wrong frequency will not effectively move any of the four armatures. If the current continues to flow for a brief period, however, the armature at that station which is tuned to respond to the selected frequency gradually gets into motion. As it is pulled over the strength of the magnetic pole strongly increases, and in order to get a powerful effect, and, in fact, relying as I do upon what might be termed "sheer brute force," I discard all delicate adjustments and safeguards and strip the magnet-pole, so that the armature may come into direct contact with it. I thus get a maximum pull and a maximum effect on the clapper just when I need it the most—that is, at the instant of possible interference due to reactive vibration from the gong. Thus I start my selective ringer by tuning it exactly, so that it will respond before striking the gong and after it has once started to vibrating I provide a strong enough action to positively overcome any interference. Those ringers, however, which have not started into good vibration, owing to their being out of tune, are of course unaffected, and I may add that the strength of the spring $c^2$ is such that it takes almost perfect resonance to overcome their stiffness.

It will be noted that I have shown condensers in the bell branches at my substations. I employ these condensers in some cases in conjunction with the windings of the magnets for the purpose of electrically tuning the branches. While my system is preferably operative without this, it is particularly adapted for use in common battery systems, the small leakage through the branches not tuned to receive a particular ringing-current being negligible on account of the stiffness of the springs $C^2$. Thus the ringer at the desired station only will get current enough to start its armature into vibration, irrespective of its mechanical tune, and, as I have stated in the foregoing, this initial vibration is essential to full actuation, as the normal position of the armature is too far from the poles of the magnet for instantaneous pulls to be effected against the stiffness of the springs.

Although I have described the bells at the substation connected in series and have described the system in the most specific way so as to make it clear to the understanding, many modifications will be apparent to those versed in the art, and all such modifications are contemplated and are considered to be within the scope and purview of the appended claims.

Having thus described my invention, what I claim, and desire to secure by Letters Patent, is—

1. A selective party-line telephone system, comprising means at the central office for throwing selective ringing-currents of different predetermined frequencies upon a line; a plurality of stations connected to said line, and a ringer at each station having its armature and clapper-rod normally held against movement in response to any but a strong force; and naked pole-pieces adapted to touch the armature at the end of each stroke, whereby after initial vibration is set up in a ringer in response to proper current, its moving parts will be exposed to a strong and cumulative force sufficient to insure full operation, substantially as described.

2. In a party-line telephone system, the combination with a telephone-line, of a plurality of substations located on the line, a bell at each substation provided with a stiffened reed-tongue, an armature attached thereto, and naked magnet-poles in the path of travel of the armature, the operative rate of actuation of the bell being the natural rate of vibration of the tongue unmodified by the action of the gong of the bell in being struck, such operative rate being characteristic at each substation, and generating apparatus at the central office to generate current of the proper frequencies to operate said bells upon the telephone-line, and means to maintain the speed of the generating apparatus constant to thereby permit the desired operation of the bells, substantially as described.

3. In a party-line telephone system, the combination with a telephone-line, of a plurality of substations located on the line, a bell at each substation provided with naked magnet-poles exposed to its armature and with a stiffened reed-tongue, the operative rate of actuation of the bells being the natural rate of vibration of the reed-tongues unmodified by the action of the gongs of the bells in being struck, a generating apparatus at the central office consisting of an electric motor and a plurality of generators mounted upon a common shaft, a governor to maintain the speed of said motor and generators constant, said generators being arranged to deliver ringing-current to the line of frequencies corresponding to such operative rates of actuation of the bells, substantially as described.

4. In a party-line telephone system, the combination with a telephone-line, of a plurality of substations located on the line, bells provided with armatures exposed to naked poles and with stiffened reed-tongues at the substations in branches of the line conductors, each reed having a characteristic rate of actuation, means at the central office for impressing ringing-current upon the line of frequencies corresponding to each characteristic rates of actuation of the reeds, and means including the coils of the bells for electrically attuning said bell branches to the ringing-currents of the associated bells, substantially as described.

5. In a party-line telephone system, the combination with a telephone-line, of a plurality of substations located on the line, bells provided with armatures exposed to naked poles and with stiffened tuned reed-tongues at the substations in branches of the line conductors, each reed having a characteristic rate of actuation, and means at the central office for impressing ringing-current upon the line of frequencies corresponding to such characteristic rates of actuation of the reeds.

6. In a party-line telephone system, the combination with a telephone-line, of a plurality of substations located on the line, bells provided with armatures exposed to naked poles and with stiffened tuned reed-tongues at the substation in branches of the line conductors, each reed having a characteristic rate of actuation, condensers in said branches, and means at the central office for impressing ringing-current upon the line of frequencies corresponding to such characteristic rates of actuation of the reeds.

In testimony whereof I affix my signature in presence of two witnesses.

WILLIAM W. DEAN.

Witnesses:
SIDNEY A. BEYLAND,
A. D. T. LIBBY.